Patented Jan. 22, 1929.

1,699,536

UNITED STATES PATENT OFFICE.

LOUIS CLEVELAND JONES, OF GREENWICH, CONNECTICUT, CHAUNCEY C. LOOMIS, OF YONKERS, NEW YORK, AND HENRY W. BANKS, 3d, OF NOROTON, CONNECTICUT; SAID LOOMIS AND SAID BANKS ASSIGNORS TO SAID JONES.

METHOD OF MAKING WATER PASTES OF BITUMINOUS MATERIALS.

No Drawing.  Application filed August 8, 1924. Serial No. 730,910.

Our invention relates more particularly to the production of asphaltic paints, cements or other like coatings used as flooring or paving material, which when coalesced and dried will form a layer or coating which will be exceptionally durable, waterproof, flexible, and not inflammable at ordinary temperatures, while also possessing the requisite stickiness.

The objects of our invention comprise, among other things, the method of dispersing suitable bituminous materials or substances in water or other liquids in which such substances are either insoluble or slightly soluble, which, after application and evaporation of the water or other liquid, will possess sufficient binding properties, to form a product of uniform composition having a wide variety of uses.

If crude Trinidad asphalt is disintegrated and then mixed with water and ground in a ball mill or other suitable grinding device, the weight of water being somewhat less than that of the asphalt, a smooth paste will be produced which may be readily spread on a suitable surface with a trowel. However, when the water has been dispelled through evaporation or otherwise, a somewhat discontinuous and friable mass of ground asphalt remains which lacks sufficient strength, continuity or toughness for industrial uses.

We have discovered that when certain substances are added to the asphaltic pastes and ground in or mixed with same, the requisite binding properties are imparted so that the dispersed asphalt is formed into a continuous mass when the water has been removed by evaporation. Such substances include gasoline, kerosene, gas oil or other petroleum products which have a solvent action on the bituminous or resinous materials. Likewise benzol, solvent naphtha and other coal tar distillates or oils such as cotton seed, linseed and the like may be successively used, or mixtures of the same.

We have also discovered that these added substances which exert a desirable solvent action on the ground bituminous materials are preferably added to the paste during the grinding process, though they may be separately emulsified in water by any suitable means and the resulting emulsion then ground or mixed with the paste. We have found that in adding such substances to the paste during the process of grinding hereinbefore referred to, it is advantageous to add a small quantity of soap, soda ash, alkalies, or other dispersing materials, whereby the oils or other substances added may be more readily dispersed through the paste.

If volatile solvents such as gasoline are employed, the resulting paste when spread out in the air will dry to a hard continuous mass possessing slight flexibility which becomes slowly harder and less flexible as the last traces of solvent are expelled. This will occur after the water has evaporated and left behind a continuous mass of asphaltic ground material.

We have also found that by using oils or non-volatile material of like nature to disperse in the paste, the ground mass upon drying can be made to assume almost any degree of softness, tackiness, or flexibility, making such mixture available for a wide variety of uses.

We have also found that such mixtures containing gasoline in quantities sufficient to produce continuous masses of asphalt after drying, are not inflammable at ordinary temperatures. In this manner it is possible to produce asphaltic paints, cements, and the like which have not the usual danger from fire which is found in the case of such mixtures made with inflammable solvents alone, and where water is not employed as a dispersion medium.

The following is an example of one of the methods which we may employ to produce our improved water pastes: 150 parts by weight of crude Trinidad asphalt are ground to a fineness of approximately 40–50 mesh, and then mixed with 135 parts by weight of water. The resulting paste is thereafter ground in a ball mill or other grinding device until the mass is brought to a smooth consistency. Fifteen parts by weight of gasoline are then added, and the grinding continued until a smooth paste is obtained. The resulting product is of a consistency easy to work with a trowel, and upon drying leaves a continuous mass of asphalt of considerable toughness and flexibility. The vapors from such a mixture cannot be ignited by a free flame. As the last traces of gasoline are evaporated the mass slowly becomes more hard and inflexible. By the use of non-volatile oils instead of gasoline a permanent flexibility or softness may be imparted to the mass, and the addition of soap or other suitable alkali material aids in dispersing the oils throughout the paste as we have described.

We have also discovered that in place of the different solvents for bitumens which we have mentioned and described, emulsified bituminous materials may be added in varying proportions and then mixed and incorporated in the ground paste with advantageous effects.

While the method hereinbefore set forth embodies our invention in a preferred form, it will be understood that changes and variations may be made without departing from the principles and scope of the invention.

We claim as our invention:

1. The method of making homogeneous water pastes from bituminous materials which comprises grinding said materials with water to produce a pasty mass, then adding in the absence of heat, a solvent for bitumens, while continuing the grinding to produce a smooth paste, and also introducing a relatively small quantity of alkali material whereby the substances in the mass may be dispersed.

2. The method of making homogeneous water pastes from bituminous materials which comprises grinding said materials with water to produce a pasty mass, then adding, in the absense of heat, a volatile hydrocarbon in which the bitumen is soluble, while continuing the grinding to produce a smooth paste, and also introducing a relatively small quantity of alkali material whereby the substances in the mass may be dispersed.

3. The method of making homogeneous water pastes from finely-divided bituminous materials which comprises mixing the disintegrated material with water and grinding same to produce a pasty mass, and then adding, in the absence of heat, a mixture of a volatile hydrocarbon in which the bitumen is soluble and a relatively small quantity of soap and continuing the grinding until the mass is reduced to a smooth paste.

LOUIS CLEVELAND JONES.
CHAUNCEY C. LOOMIS.
HENRY W. BANKS, 3RD.